United States Patent
Wippler (10) Patent No.: US 9,626,089 B2
(45) Date of Patent: Apr. 18, 2017

(54) DETERMINATION AND INDICATION OF INCLUDED SYSTEM FEATURES

(71) Applicant: Toyota Motor Engineering & Manufacturing North America, Inc., Erlanger, KY (US)

(72) Inventor: Erik Anthony Wippler, Canton, MI (US)

(73) Assignee: Toyota Motor Engineering & Manufacturing, Erlanger, KY (US)

( * ) Notice: Subject to any disclaimer, the term of this patent is extended or adjusted under 35 U.S.C. 154(b) by 32 days.

(21) Appl. No.: 14/599,115

(22) Filed: Jan. 16, 2015

(65) Prior Publication Data

US 2016/0210031 A1    Jul. 21, 2016

(51) Int. Cl.
| | | |
|---|---|---|
| G06F 3/00 | (2006.01) | |
| G09G 5/00 | (2006.01) | |
| G06F 3/0484 | (2013.01) | |
| B60K 37/02 | (2006.01) | |
| B60K 35/00 | (2006.01) | |

(52) U.S. Cl.
CPC .......... *G06F 3/04847* (2013.01); *B60K 35/00* (2013.01); *B60K 37/02* (2013.01); *G06F 3/04842* (2013.01); *B60K 2350/1004* (2013.01)

(58) Field of Classification Search
None
See application file for complete search history.

(56) References Cited

U.S. PATENT DOCUMENTS

| | | | | |
|---|---|---|---|---|
| 6,525,878 | B1 * | 2/2003 | Takahashi | G02B 21/0012 359/376 |
| 7,086,735 | B1 * | 8/2006 | Provitola | G02B 27/2221 353/10 |
| 7,570,259 | B2 * | 8/2009 | Banginwar | G06F 1/3203 345/156 |
| 8,344,870 | B2 | 1/2013 | Evans et al. | |
| 9,082,256 | B2 * | 7/2015 | Griswold | |
| 2002/0196238 | A1 * | 12/2002 | Tsukada | G06F 3/0421 345/173 |
| 2003/0090443 | A1 * | 5/2003 | Kobayashi | G09G 3/2986 345/60 |
| 2003/0151589 | A1 * | 8/2003 | Bensen | G06F 3/0414 345/156 |
| 2004/0019539 | A1 * | 1/2004 | Raman | H04W 4/24 705/29 |
| 2004/0255965 | A1 * | 12/2004 | Perfetti | A24B 15/12 131/353 |

(Continued)

*Primary Examiner* — Ashish K Thomas
(74) *Attorney, Agent, or Firm* — Christopher G. Darrow; Darrow Mustafa PC (57) ABSTRACT

Arrangements related to the selective indication of features included on a system are described. A plurality of graphical indicator elements can be provided. Each of the feature graphical indicators can represent a respective feature of a predefined set of features that are potentially included on the system. It can be determined whether one or more features of the predefined set of features are included on the system. In response to determining that one or more features of the predefined set of features are included on the system, the feature graphical indicators corresponding to the detected one or more features can be selectively displayed.

21 Claims, 6 Drawing Sheets

(56) References Cited

U.S. PATENT DOCUMENTS

| | | | |
|---|---|---|---|
| 2006/0061563 A1* | 3/2006 | Fleck | G06F 1/1616 345/211 |
| 2006/0176278 A1* | 8/2006 | Mathews | G09G 3/20 345/168 |
| 2006/0202944 A1* | 9/2006 | Hillis | G09F 9/30 345/102 |
| 2008/0052422 A1* | 2/2008 | Zhu | G06F 3/04886 710/14 |
| 2008/0204423 A1* | 8/2008 | Kim | G06F 3/04886 345/173 |
| 2009/0058819 A1* | 3/2009 | Gioscia | G06F 3/044 345/173 |
| 2009/0083656 A1* | 3/2009 | Dukhon | G06F 17/24 715/781 |
| 2011/0215990 A1* | 9/2011 | Liesenberg | G09G 5/00 345/1.3 |
| 2012/0075194 A1* | 3/2012 | Ferren | G02B 13/0065 345/168 |
| 2012/0176302 A1* | 7/2012 | Mangoubi | G06F 3/015 345/156 |
| 2013/0145279 A1 | 6/2013 | Ricci | |
| 2013/0235044 A1* | 9/2013 | Kaleta | G06F 3/0484 345/473 |
| 2015/0222700 A1* | 8/2015 | Kay | H04L 67/1095 709/203 |

\* cited by examiner

DETERMINATION AND INDICATION OF INCLUDED SYSTEM FEATURES

FIELD

The subject matter described herein relates in general to electronic devices and, more particularly, to electronic devices that have various potential features or combinations of features.

BACKGROUND

An automobile includes numerous systems. For instance, an automobile is typically equipped with an audio system. An audio system can include various features or components. For instance, an audio system may include one or more satellite radio systems and/or premium audio components. In many instances, specific satellite radio systems and/or premium audio components used may have an associated identifier (e.g. a logo or a trademark). The identifier can be printed, painted or stamped on an exterior surface of a portion of the audio system. The identifier can visually apprise a user that the audio system includes a particular system or component.

SUMMARY

In one respect, the present disclosure is directed to a method of selectively indicating the features included on a system. The method includes providing a plurality of feature graphical indicators. Each of the feature graphical indicators can represent a respective feature of a predefined set of features that are potentially included on the system. The method can include determining whether one or more features of the predefined set of features are included on the system. The method can also include, responsive to determining that one or more features of the predefined set of features are included on the system, selectively displaying the feature graphical indicators corresponding to the detected one or more features.

In another respect, the present disclosure is directed to a system for indicating the features that are included on a system or device. The system includes an obscuring panel having an inner side and an outer side. The system includes one or more light sources located on the inner side of the obscuring panel. The system further includes a plurality of feature graphical indicators. The plurality of feature graphical indicators can be located on the inner side of the obscuring panel between the light source and the obscuring panel. Each of the feature graphical indicators can correspond to a respective feature that is potentially included on the system. The system can include a feature detection system. The feature detection system can be configured to determine whether one or more features of the predefined set of features are included on the system. The system can include a controller operatively connected to the light source and the feature detection system. The controller can be configured to, responsive to determining that one or more features of the predefined set of features are included on the system, selectively displaying the feature graphical indicators corresponding to the detected one or more features.

DETAILED DESCRIPTION

This detailed description relates to determining and indicating the availability of certain features on a system or device. More particularly, it can be determined which features from a predefined set of features are available and/or enabled on a system or device. In one or more implementations, responsive to detecting that one or more of the predefined set of features are available and/or enabled on the system or device, selectively displaying one or more graphical indicators corresponding to the detected one or more of the predefined set of features that are available and/or enabled on the system or device. The present detailed description relates to systems, methods and computer program products that incorporate one or more of such features. In at least some instances, such systems, methods and computer program products can, for example, facilitate part commonality, reduce complexity in inventory and assembly, provide a pleasing visual appearance and/or provide information to a user.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
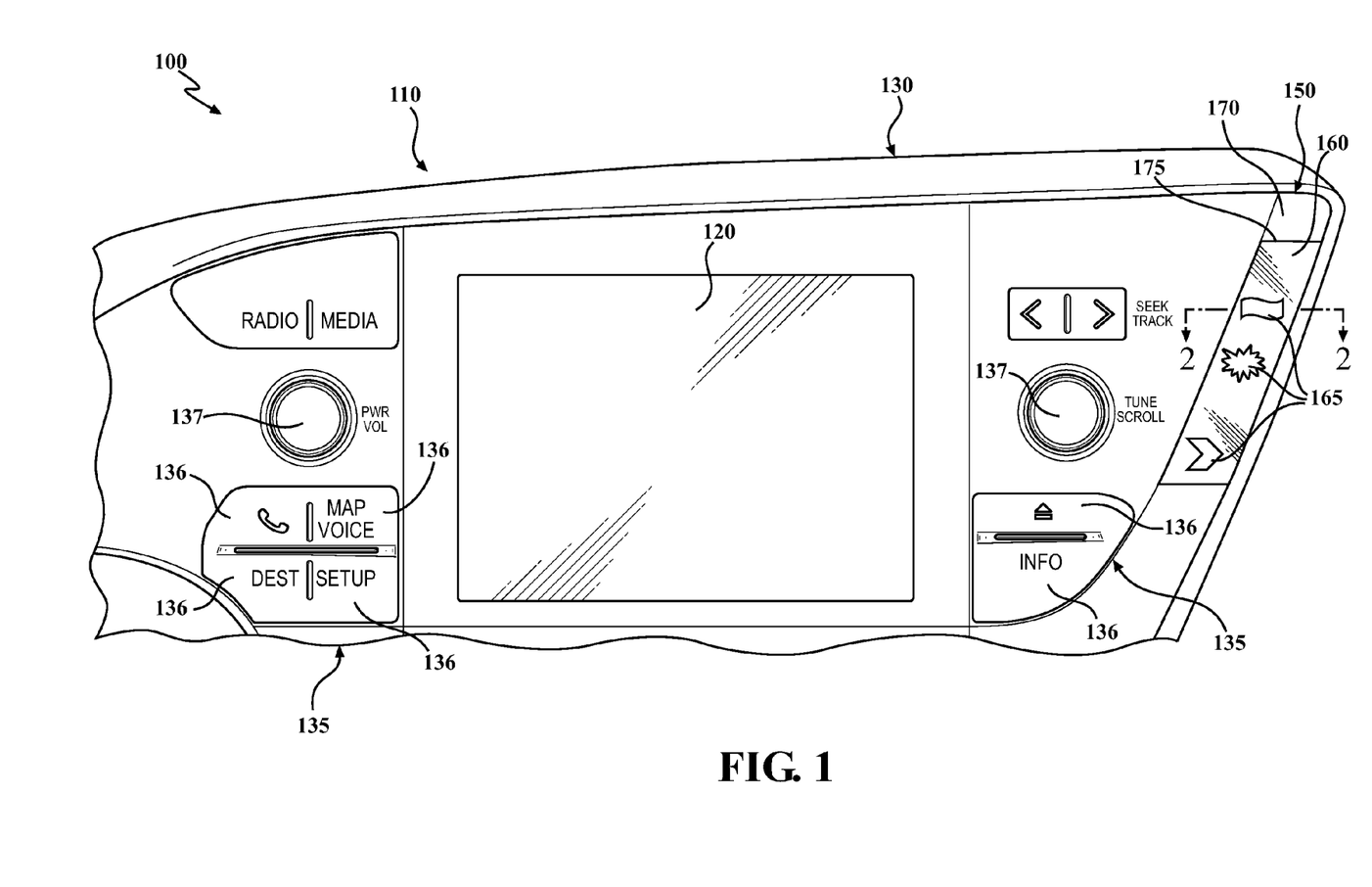
FIG. 1 is an example of a portion of an in-vehicle audio system.

Referring to FIG. 1, an example of a system 100 is shown. In this particular example, the system 100 can be an in-vehicle system; however, it will be understood that arrangements are not limited to in-vehicle uses or even vehicular uses. The system 100 can include an electronic device 110. "Electronic device" means any device that is at least partially powered by electrical energy. In one or more arrangements, the electronic device 110 can present one or more forms of content to a user. Examples of such forms of content can include text, audio, video, animation, still images, graphics and/or interactivity.

The electronic device 110 can be any suitable device or system including, for example, a portable communication device or system, a portable computing device or system, an entertainment device or system (e.g., a music or video device or system), an audio device or system, a radio device or system, a global positioning system device or system, a navigation device or system, a multi-media device or any other suitable device. The electronic device 110 can be configured to communicate via a wireless or wired medium.

Arrangements described herein can be implemented into any suitable electronic device, including any of those listed above and/or combinations of one or more of those listed above and/or other electronic devices. Arrangements presented herein will be described in connection with an audio system; however, it will be understood that the audio system used merely to facilitate the description and arrangements are not limited to the specific arrangements shown and described. Further, the electronic device 110 can serve as a portion of two or more systems. As an example, at least a portion of the audio system may also be a portion of a backup display system and/or navigation system.

The electronic device 110 may have a display 120. A "display" is defined as a component or a group of components that present information/data in visual form, including, for example, video, images, graphics, etc. The display 120 can be any suitable type of display. For instance, the display 120 can be a liquid crystal display (LCD), a light emitting diode (LED) display, plasma display panel (PDP), a light emitting diode (LED) display, or liquid crystal on silicon (LCoS) or some other suitable display. In one or more arrangements, the display 120 can be a touch screen display, a multi-touch display or a remotely controlled display. A touch screen can allow a user to engage or interact with one or more displayed elements, such as a graphical user interface (GUI), and/or other applications running on any system of the electronic device 110, including any of those described herein, through contact with the display 120. For example, a user may make selections and move a cursor by touching the display 120 via a finger or stylus.

In one or more implementations, the electronic device 110 can be included in a vehicle. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle may be a motorcycle, watercraft, an aircraft or any other form of motorized transport.

In one or more arrangements, the electronic device 110 can be located in a front interior portion of a vehicle. As an example, the electronic device 110 can be installed in a dashboard or instrument panel 130 of a vehicle. In one or more arrangements, the electronic device 110 can be portable so that it can be selectively installed and removed from the vehicle. In such case, the electronic device 110 can be selectively used in a plurality of vehicles, as a handheld device and/or in one or more non-vehicular applications.

The electronic device 110 can include one or more interfaces 135. An "interface" is defined as a component, system or arrangement or groups thereof that enable information/data to be entered into a machine. The interfaces can include one or more user interface elements. A "user interface element" is defined as a component or a group of components that enables a user to interact with a machine. In one or more arrangements, the user interface elements can include buttons 136, dials 137, knobs, keys, and/or other elements. In one or more arrangements, the user interface elements can include one or more graphical user interface elements. The term "graphical user interface element" is defined as an image or a portion of an image that presents information to a user or allows the user to interact with a device through a display.

The electronic device 110 can include a feature indication area 150. "Feature indication area" is any portion of an electronic device in which a representation of a feature or component determined to be included, available and/or enabled on the electronic device or system is displayed. One or more feature graphical indicators 165 can be presented in the feature indication area 150. "Feature graphical indicator" means any element that can be visually perceived by the human sense of sight and which represents, indicates and/or identifies a feature or component. Non-limiting examples of feature graphical indicators include one or more names, initials, letters, words, trademarks, service marks, logos, characters, designs, shapes, symbols, icons, pictures, images, graphics and/or other visual elements.

The feature indication area 150 can have any suitable form. In one or more arrangements, the feature indication area 150 can be provided in a structure or a wall 170 of a vehicle or of an electronic device. In or more arrangements, the wall 170 can include an opening 175. In one or more arrangements, the feature indication area 150 can include an obscuring panel 160.

The obscuring panel 160 can have any size, shape and/or cross-sectional geometry. In one or more arrangements, the shape of the obscuring panel 160 can be substantially rectangular, substantially triangular, substantially circular, substantially oval, substantially oblong, substantially rhombic, substantially trapezoidal, or substantially parallelogram, just to name a few possibilities. The obscuring panel 160 can be substantially planar. As used herein, the term "substantially" includes exactly the term it modifies and slight variations therefrom. Thus, for example, the term "substantially rectangular" means exactly rectangular and slight variations therefrom.

Figure 2:
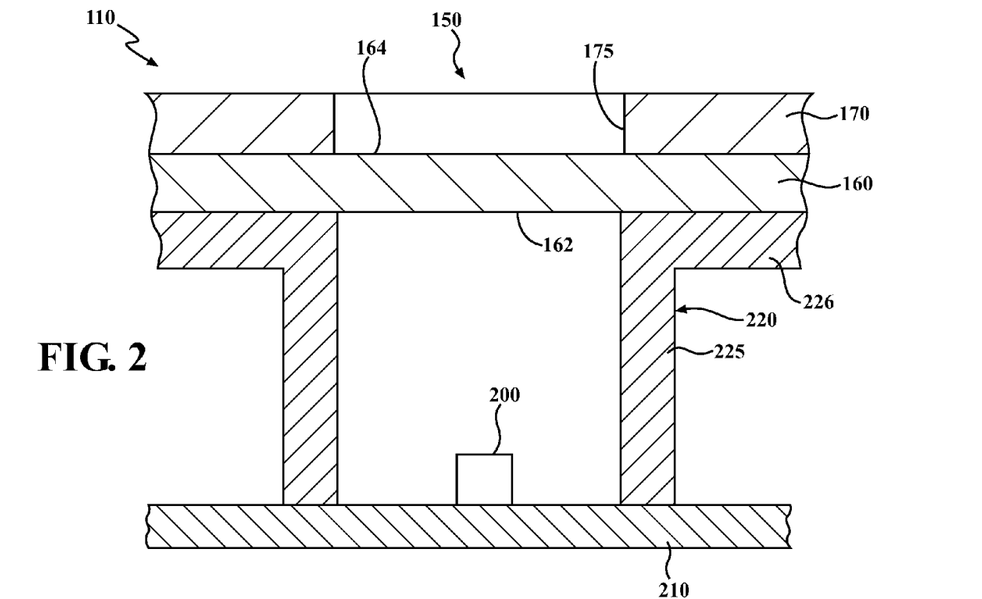
FIG. 2 is a cross-sectional view of a portion of the in-vehicle audio system of FIG. 1, viewed along line 2-2 in FIG. 1.

Referring to FIG. 2, the obscuring panel 160 can include an inner side 162 and an outer side 164. In this context, the terms "inner" and "outer" refer to the relative position of the sides with respect to a user. Thus, the outer side 164 is located closer to a user than the inner side 162. The inner side 162 can be substantially parallel to the outer side 164. However, in one or more arrangements, the inner side 162 may be non-parallel to the outer side 164 in at least one or more portions of the obscuring panel 160.

The obscuring panel 160 can be made of any suitable material. For instance, the obscuring panel 160 can be made of any suitable plastic or glass. In one or more arrangements, the obscuring panel 160 can be made of a transparent material. In one or more arrangements, the obscuring panel 160 can be made of a translucent material.

In one or more arrangements, at least a portion of the obscuring panel 160 can be treated or configured to obstruct viewing through the obscuring panel 160. For instance, at least a portion of the obscuring panel 160 can be treated or otherwise configured to have an obscuring appearance under ambient lighting conditions. Thus, when viewed from outer side 164 of the obscuring panel 160, a person cannot see or cannot readily see an object located on the inner side 162 of the obscuring panel 160. However, when a light source or other element is activated on the inner side 162 of the obscuring panel 160, a person may be able to see at least a portion of an object located behind the inner side 162 of the obscuring panel 160.

An obscuring appearance can be provided in any suitable manner. For instance, an obscuring appearance can be provided if the obscuring panel includes a smoky or frosted appearance. The obscuring appearance can be provided on the inner side 162 and/or the outer side 164 of the obscuring panel 160. Alternatively or in addition, the obscuring appearance can be provided within a least a portion of the body of the obscuring panel 160.

Figure 3:
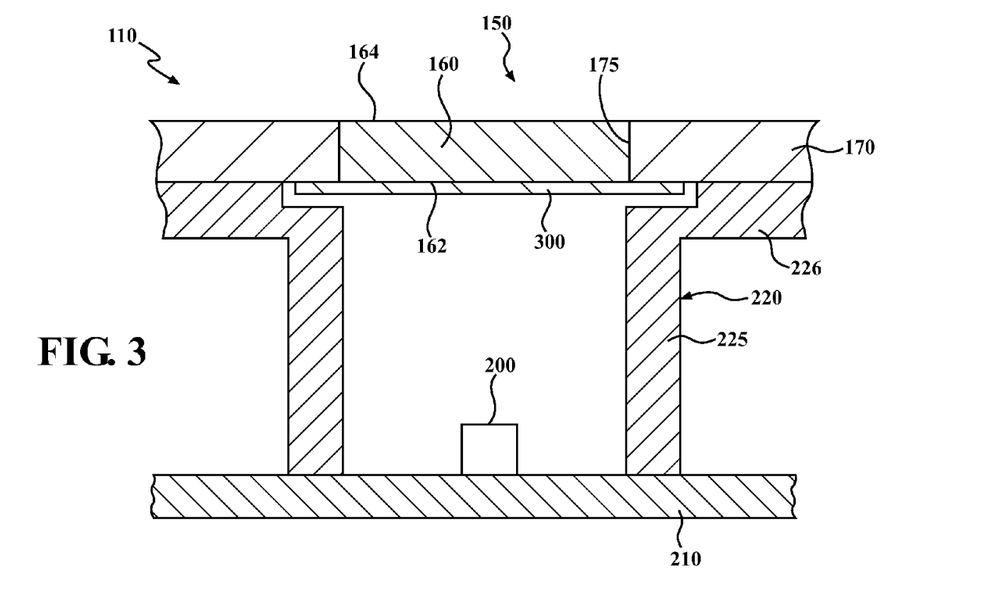
FIG. 3 is a cross-sectional view of a portion of the in-vehicle audio system, showing an arrangement in which a plurality of feature graphical indicators is provided on a separate substrate.

The obscuring panel 160 can be positioned with respect to the opening 175. In one or more arrangements, the obscuring panel 160 can substantially cover or substantially close the opening 175. In one or more arrangements, the obscuring panel 160 can be provided on the inner side 162 of the obscuring panel 160. One example of such an arrangement is shown in FIG. 2. In one or more arrangements, the obscuring panel 160 can be provided on the outer side 164 of the obscuring panel 160. In one or more arrangements, at least a portion of the obscuring panel 160 can be provided in the opening 175. One example of such an arrangement is shown in FIG. 3. The obscuring panel 160 can be operatively connected to the wall 170 in any suitable manner. The term "operatively connected," as used throughout this description, can include direct or indirect connections, including connections without direct physical contact. In one or more arrangements, the obscuring panel 160 can be attached to the wall 170 by one or more fasteners, one or more adhesives, and/or one or more forms of mechanical engagement, just to name a few possibilities. In one or more arrangements, the obscuring panel 160 can be sandwiched between the wall 170 and one or more other elements.

The electronic device 110 can include a plurality of feature graphical indicators 165 (only some of which are visible in FIG. 1). The feature graphical indicators 165 can be located on the inner side 162 of the obscuring panel 160. "Located on the inner side of the obscuring panel" means that the feature graphical indicators are located on or behind the inner side of the obscuring panel when viewing the obscuring panel from the outer side. The plurality of feature graphical indicators 165 can be aligned with the opening 175 in the wall 170.

The feature graphical indicators 165 can be provided in any suitable manner. In one or more arrangements, the feature graphical indicators 165 can be provided on the inner side 162 of the obscuring panel 160. One example of such an arrangement is shown in FIG. 2.

Alternatively or in addition, the plurality of feature graphical indicators 165 can be provided on an element or substrate that is separate from the obscuring panel 160. One example of such an arrangement is shown in FIG. 3. In the arrangement shown, the plurality of feature graphical indicators 165 can be provided on a substrate 300.

Figure 4:
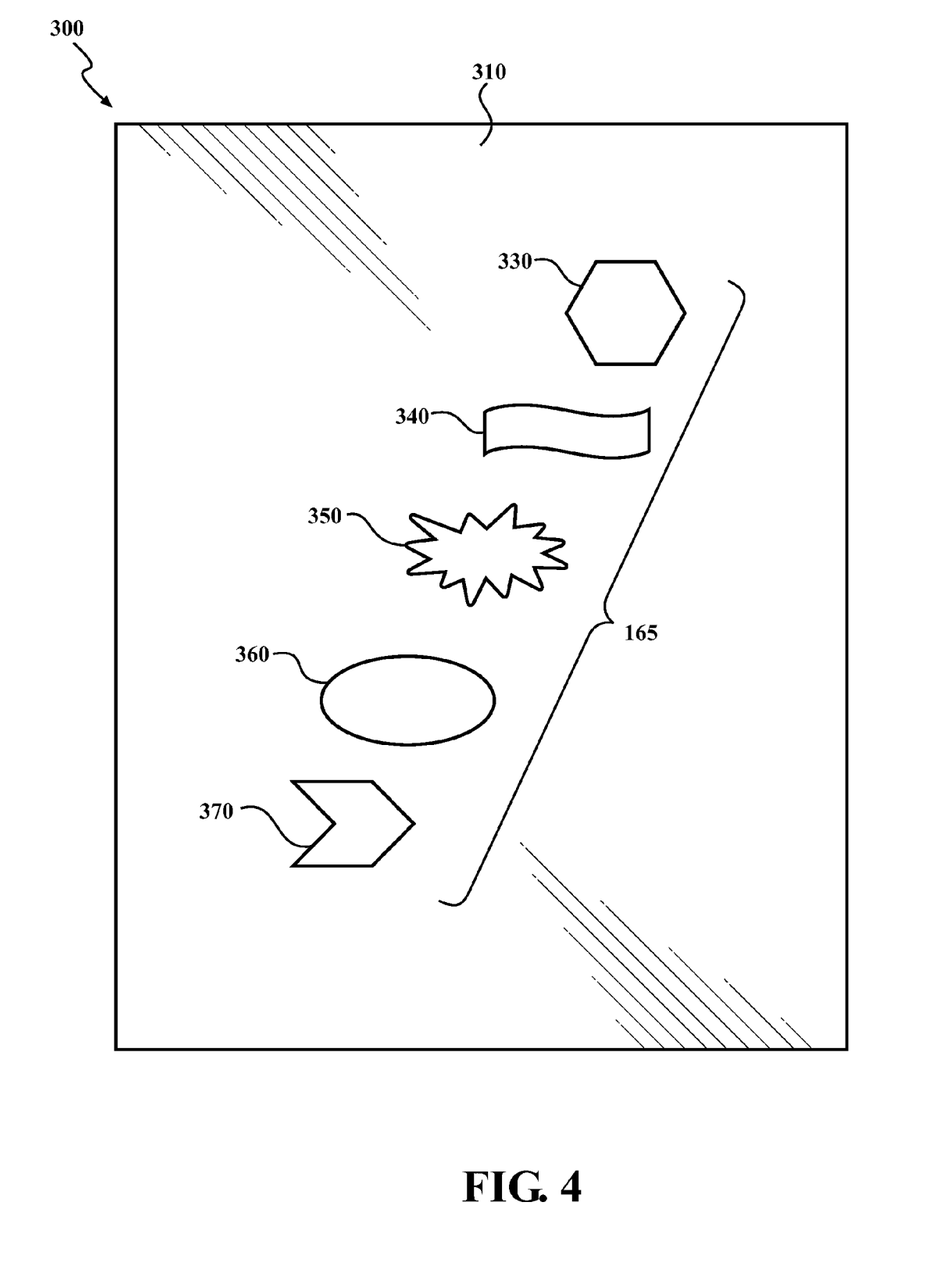
FIG. 4 is an example of a substrate on which a plurality of feature graphical indicators is provided.

FIG. 4 shows one example of the substrate 300. The feature graphical indicators 165 can be provided on a surface 310 of the substrate 300. The substrate 300 can have sufficient material and/or physical characteristics or properties to allow at least the partial passage of light therethrough. In one or more arrangements, the substrate 300 can be a relatively thin mass of material.

The substrate 300 can have any suitable form. For instance, in one or more arrangements, the substrate 300 can be provided in the form of a sheet, a foil or a film. The substrate 300 can have any suitable shape. In one or more arrangements, the substrate 300 can be substantially rectangular, but it will be understood that arrangements are not limited to this shape. Indeed, the substrate 300 can be substantially triangular, substantially circular, substantially oval, substantially oblong, substantially rhombic, substantially trapezoidal, or substantially parallelogram, just to name a few possibilities. The sheet 30 can be made of any suitable material, including, for example, paper, plastic, glass and/or metal.

The feature graphical indicators 165 can be provided on the substrate 300 in any suitable manner. In one or more implementations, the feature graphical indicators 165 can be printed, painted or stamped onto the substrate 300. In one or more arrangements, the feature graphical indicators 165 can be provided on the substrate 300 by photo-etching. In one or more arrangements, the feature graphical indicators 165 can be provide by forming cutouts in the substrate 300. In one or more implementations, the feature graphical indicators 165 can be attached to one or more surfaces (e.g. surface 310) of the substrate 300 by, for example, static cling, adhesive or other suitable form of attachment.

When the substrate 300 is a separate element from the obscuring panel 160, the substrate 300 can have any suitable relationship relative to other components of the system 100. In one or more arrangements, the substrate 300 can be attached to one or more other structures. For example, the substrate 300 can be attached to the inner side 162 of the obscuring panel. Alternatively or in addition, the substrate 300 can be attached to an inner side of the wall 170. In one or more arrangements, which can be an alternative to in addition to the above, the substrate 300 can be attached to another structure located behind the inner side 162 of the obscuring panel 160. For instance, the substrate 300 can be attached to a light conduit 220. In arrangements in which the substrate is 300 attached to the wall 170 and/or one or more other structures, any suitable form of attachment can be used, including, for example, by one or more fasteners, one or more adhesives, one or more forms of mechanical engagement, one or more forms of welding and/or one or more forms of brazing, just to name a few possibilities. In one or more arrangements, the substrate 300 can be sandwiched between the wall 170 and one or more other structures. In one or more arrangements, the substrate 300 may not be attached to another structure.

The electronic device 110 can include any quantity of feature graphical indicators 165. In the arrangement shown in FIG. 4, there are five feature graphical indicators 165: a first feature graphical indicator 330, a second feature graphical indicator 340, a third feature graphical indicator 350, a fourth feature graphical indicator 360, and a fifth feature graphical indicator 370. The plurality of feature graphical indicators 165 can be visually distinct from each other. The plurality of feature graphical indicators 165 can be arranged and/or distributed on the substrate 300 (or obscuring panel 160) in any suitable manner. The plurality of feature graphical indicators 165 can be arranged and/or distributed so as to fit within the opening 175 provided in the wall 170. Each feature graphical indicators 165 can correspond to a particular feature, system, device, component or characteristic of the electronic device 110. For instance, the first feature graphical indicator 330 can correspond to a first potential satellite radio feature, the second feature graphical indicator 340 can correspond to a second potential satellite radio feature, the third feature graphical indicator 350 can correspond to a first potential premium audio component, the fourth feature graphical indicator 360 can correspond to a second potential premium audio component, and the fifth feature graphical indicator 370 can correspond to a third potential premium audio component.

One or more of the feature graphical indicators 165 can be directly related to the electronic device 110. However, in some instances, one or more of the feature graphical indicators 165 can be indirectly related or unrelated to the electronic device 110. For instance, if the electronic device 110 is an audio system, an example of an indirectly related or unrelated feature graphical indicator is one that relates to a feature of a navigation system of the vehicle.

Referring to FIGS. 2 and 3, the system 100 can include one or more light sources 200. The light source 200 can be at least partially electrically powered. The light source 200 can be operative connected to receive electrical energy from a suitable source of electrical energy (not shown). The light source 200 can generate or emit any type of light. In one embodiment, the light source 200 can be one or more light emitting diodes (LEDs). However, arrangements are not limited to LEDs, as any suitable light source can be used. The light source 200 can emit light energy with any suitable characteristics, including visible or non-visible wavelengths. In one or more arrangements, the light source 200 can include a plurality of light sources. In one or more arrangements, the light source 200 can be configured to allow one or more characteristics of light energy emitted therefrom to be altered. For example, the light source 200 can be configured to allow the wavelength of the light energy emitted therefrom to be altered to achieve different colors. In one or more arrangements, the color and/or brightness of the light energy emitted from the light source 200 can be configured to substantially match or be substantially similar to the styling of a vehicle in which the electronic device 110 is used. For instance, the light source 200 can be configured to substantially match the color and/or brightness of other light energy emitted within a vehicle. The light energy output characteristics can be set by a user or by some other entity (e.g. a manufacturer).

In one or more arrangements, the electronic device 110 can include a second substrate 210. The second substrate 210 can be located within the electronic device 110. In one or more arrangements, the second substrate 210 can be a printed circuit board. The light source 200 can be operatively connected to the second substrate 210. In one embodiment, the light source 200 can be mounted directly on the second substrate 210.

There can be any suitable quantity of light sources 200. In one or more arrangements, there can be a single light source 200. In one or more arrangements, there can be a plurality of light sources 200. The plurality of light sources 200 can correspond to respective feature graphical indicators 165. In one or more arrangements, one or more light sources 200 can correspond to a respective one of the feature graphical indicators 165. In one or more arrangements, a light source 200 can correspond to a plurality of the feature graphical indicators 165. In one or more arrangements, there can be a dedicated single light source 200 for each of the feature graphical indicators 165. The light source 200 can be substantially aligned with the corresponding feature graphical indicators 165 thereof. Thus, light energy emitted from the light source 200 can impinge on the respective feature graphical indicator(s) 165.

The light source 200 can have one or more operational modes. For instance, the light source 200 can have a first operational mode, in which the light source activated. In such case, light energy is emitted from the light source 200. The light source 200 can also have a second operational mode, in which the light source is 200 deactivated. In such case, light energy is substantially not emitted from the light source 200. "Substantially not emitted" includes instances in which no light energy is emitted from the light source 200 as well as instances in which a minimal amount of light energy is emitted from the light source 200 such that no light energy or a negligible amount of light energy passes through the substrate 300 and/or the obscuring panel 160.

The electronic device 110 can also include a light conduit 220 (see FIGS. 2 and 3). A "light conduit" is any structure that allows the passage of light energy therethrough in one or more directions and with minimal absorption of the light energy passing therethrough. The light conduit 220 can have any suitable conformation. In such case, the light conduit 220 can have a main body 225. The main body 225 can have any suitable conformation. In one embodiment, the main body 225 can have a substantially circular cross-sectional shape, but other cross-sectional shapes are possible, including substantially oval, substantially triangular, substantially rectangular, substantially trapezoidal, and substantially polygonal, just to name a few possibilities. The cross-sectional size and shape of the main body 225 can be substantially uniform, or at least one of the cross-sectional size and shape of the main body 225 can vary along at least a portion of the length of the main body 225. The light conduit 220 can be hollow, as is shown in FIGS. 2 and 3, or it can be substantially solid.

The light conduit 220 can be operatively positioned between the light source 200 on one hand and the feature graphical indicators 165 on the other hand. The light conduit 220 can be operatively connected to one or more structures of the electronic device 110 in any suitable manner. For instance, the light conduit 220 can be operatively connected to the obscuring panel 160, the wall 170, the substrate 300, and/or the second substrate 210. In some instances, the light conduit 220 can be configured to facilitate its attachment to another structure. For instance, the light conduit 220 can include one or more flanges 226 that extend from the main body 225, as is shown in FIGS. 2 and 3. The light conduit 220 can contact and/or otherwise engage one or more structures (e.g. the obscuring panel 160, the wall 170, the substrate 300 and/or the second substrate 210) in a substantially light-tight manner.

There can be any suitable quantity of light conduits 220. In one or more arrangements, there can be a plurality of light conduits 220. For example, a light conduit 220 can be provided for each light source 200 and respective feature graphical indicator 165.

Figure 5:
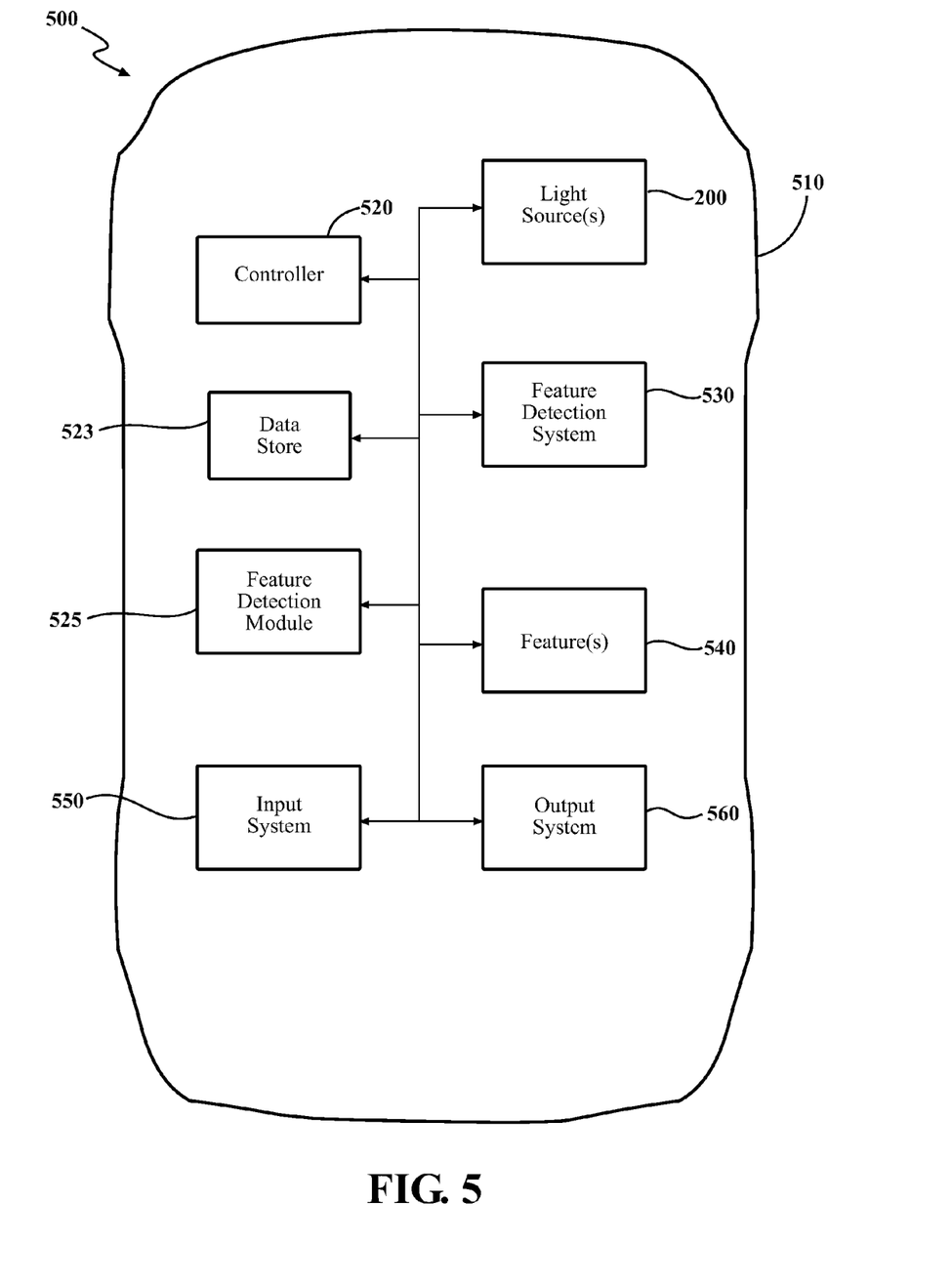
FIG. 5 is an example of a vehicle configured for selective display of feature graphical indicators corresponding to available system features.

Referring to FIG. 5, a system 500 is shown. The system 500 can be used in connection with a vehicle 510, but arrangements are not limited to use of the system 500 with vehicles. The system 500 can include one or more light sources 200.

Some of the possible elements of the system 500 are shown in FIG. 5 and will now be described. It will be understood that it is not necessary for the system 500 to have all of the elements shown in FIG. 5 or described herein. The system 500 can have any combination of the various elements shown in FIG. 5. Further, the system 500 can have additional elements to those shown in FIG. 5. In some arrangements, the system 500 may not include one or more of the elements shown in FIG. 5. The various elements of the system 500 can be operatively connected to each other in any suitable manner.

In one or more arrangements, the system 500 can include a feature detection system 530. The feature detection system 530 can include one or more sensors. "Sensor" means any device, component and/or system that can detect, determine, assess, measure, quantify and/or sense something. In arrangements in which the feature detection system 530 includes a plurality of sensors, the sensors can work independently from each other or one or more of the sensors can work in combination with each other. The feature detection system 530 and/or the one or more sensors can be operatively connected to one or more elements of the system 500, including any of those shown in FIG. 5.

The feature detection system 530 can include any suitable type of sensor. For example, in one or more arrangements, the feature detection system 530 can include one or more sensors configured to detect, determine, assess and/or sense whether one or more features from a predefined set of features that are available and/or enabled on the system 500. For instance, in the context of an audio system, the predefined set of features can include particular satellite radio systems and/or particular premium audio components or systems. In one or more arrangements, the feature detection system 530 can detect the presence of one or more software programs or applications that are available and/or enabled on the system 500.

The system 500 can include one or more controllers 520. "Controller" means any component or group of components that are configured to execute processes (including any of the processes described herein) or any form of instructions to carry out such processes or cause such processes to be performed. The controller 520 may be implemented with one or more general-purpose and/or one or more special-purpose processors. Examples of suitable controllers include microprocessors, microcontrollers, DSP processors, and other circuitry that can execute software. Further examples of suitable controllers include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The controller 520 can include at least one hardware circuit (e.g., an integrated circuit) configured to carry out instructions contained in program code. In arrangements in which there is a plurality of controllers 520, such controllers can work independently from each other or one or more controllers can work in combination with each other.

The system 500 can include one or more data stores 523 for storing one or more types of data. The data store 523 can include volatile and/or non-volatile memory. Examples of suitable data stores 523 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 523 can be a component of the controller 520, or the data store 523 can be operatively connected to the controller 520 for use thereby.

The system 500 can include a feature detection module 525. The feature detection module 525 can be implemented as computer readable program code that, when executed by a controller or processor, implement various processes described herein. For instance, the feature detection module 525 can be configured to determine whether one or more features from a predefined set of features are available and/or enabled on the system 500. However, it will be understood that the feature detection module 525 can be configured to determine other things as well.

The feature detection module 525 can be a component of and/or executed on the controller 520, or the feature detection module 525 can be executed on and/or distributed among other processing systems to which the controller 520 is operatively connected. The feature detection module 525 can include instructions (e.g., program logic) executable by the controller 520. Alternatively or in addition, the data store 523 may contain such instructions.

The system 500 can include an input system 550. An "input system" is defined as any device, component, system, element or arrangement or groups thereof that enable information/data to be entered into a machine. The input system 550 can receive an input from a user (e.g. a person, a vehicle occupant, etc.). Any suitable input system 550 can be used, including, for example, a keypad, display, touch screen, multi-touch screen, button, joystick, mouse, trackball, microphone and/or combinations thereof.

The system 500 can include an output system 560. An "output system" is defined as any device, component, system, element or arrangement or groups thereof that enable information/data to be presented to a user (e.g. a person, a vehicle occupant, etc.). The output system 560 can include one or more visual outputs, including, for example, one or more displays (e.g. display 120 in FIG. 1). Alternatively or in addition, the output system 560 may include one or more audial outputs, including, for example, a microphone, earphone and/or speaker.

One or more components may serve as both a component of the input system 550 and a component of the output system 560. For example, a display may serve as both a component of the input system 550 and as a component of the output system 560.

The electronic device 110 can have one or more features 540. As noted above, the term "feature" includes a feature, system, device, component or characteristic of the electronic device 110. In some instances, one or more of the features 540 may be indirectly related or even unrelated to the electronic device 110, but may be related to a system in which the electronic device 110 is used (e.g. vehicle 510 or a system of the vehicle 510). When the system 500 is an audio system, the features 540 can include one or more satellite radio systems and/or one or more premium audio components or systems. The features can also include wireless communication capabilities. As another example, the features can include one or more subscription based systems (e.g. telematics system, in-vehicle security system, hands free calling system, navigation system, remote diagnostics system, roadside assistance system, etc.). For instance, one feature can be the SAFETY CONNECT® system available from Toyota Motor Corporation.

The controller 520 and/or the feature detection system 530 can be configured to determine whether one or more features from a predefined set of features are available and/or enabled on the system 500. In this context, the term "set" means two or more features. "Available" means that the particular feature is at least partially included on the system. The feature may be fully ready for use or the feature can be almost ready for use (e.g. activation, set-up, product key and/or registration to begin use). Available can also include trial versions of a feature. "Enabled" means that a particular feature is fully ready for use. With respect to the features on the system 500, the term "included" means a feature that is available and/or enabled.

Responsive to determining that a feature is enabled and/or available, the controller 520 can be configured to selectively cause one or more of the feature graphical indicators 165 to be displayed. For instance, the controller 520 can be operatively connected to selectively activate or deactivate the light source 200 operatively associated with the feature graphical indicator 165 that corresponds to each feature from the predefined set of features that is detected as being enabled and/or available. If a feature is determined to be unavailable or non-enabled, then the feature graphical indicators 165 associated with such features are not displayed.

In one or more arrangements, the electronic device can be configured to distinguish between features that are enabled and features that are available. In such case, arrangements described here can be configured to cause one or more characteristics of the light energy output from the light source 200 to be varied to indicate whether a feature is enabled or available. For instance, if a feature is enabled, then the controller 520 can cause the light source 200 to be activated to output light energy at a first wavelength corresponding to a first color. However, if a feature is available but not enabled, then the controller 520 can cause the light source 200 to be activated to output light energy at a second wavelength corresponding to a second color. The first color can be different from the second color.

Alternatively or in addition, the duration of the light output can be varied to indicate whether a feature is available or enabled. For instance, if a feature is enabled, then the controller 520 can cause the light source 200 to be activated to substantially continuously output light energy. However, if a feature is available but not enabled, then the controller 520 can cause the light source 200 to be activated to output light energy periodically so as to appear to be blinking or flashing.

It will be appreciated that if a feature is not detected or is not available and not enabled, then the light source 200 associated with such feature can remain deactivated or can be deactivated. As a result, the feature graphical indicator 165 will not be displayed. Thus, a user will not be able to see the respective feature graphical indicator 165 through the obscuring panel 160.

Figure 6:
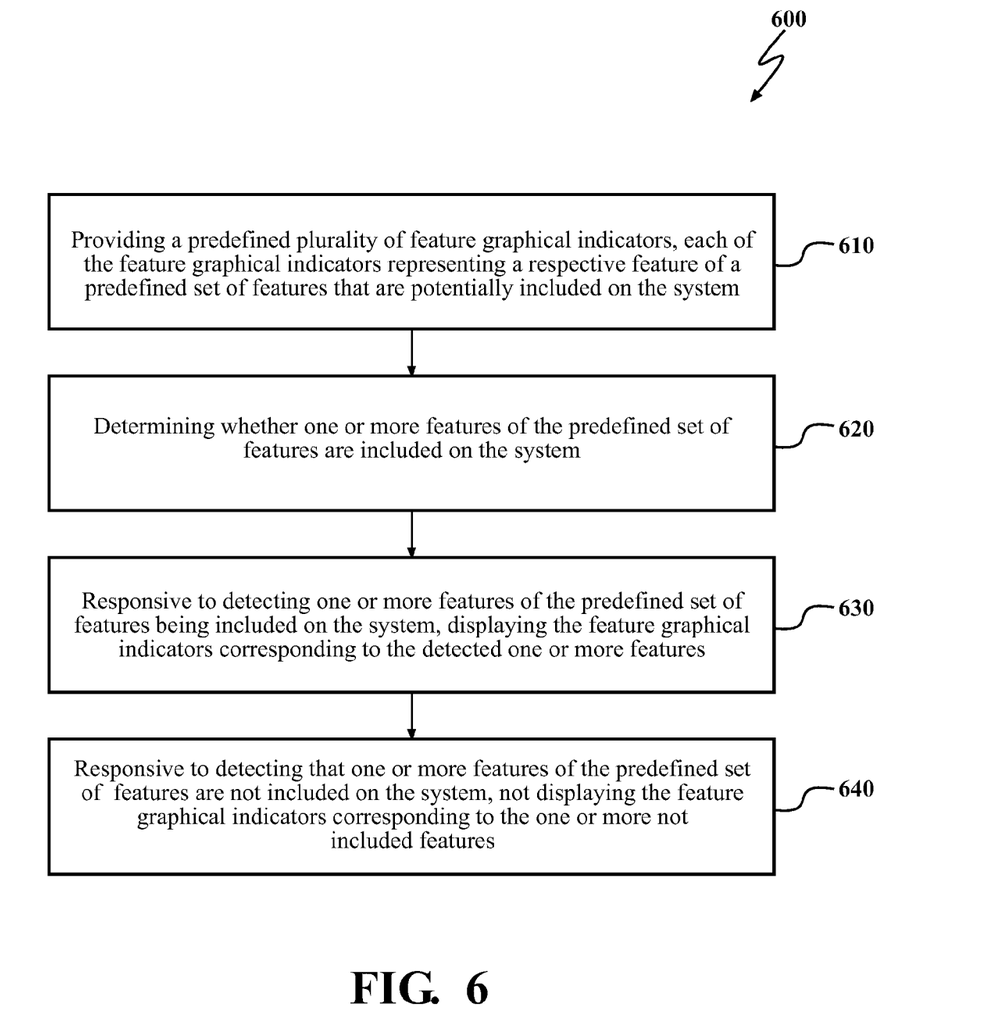
FIG. 6 is an example of a method for selectively displaying graphical indicators corresponding to available system features.

Now that the various potential systems, devices, elements and/or components have been described, various methods for indicating the features enabled on a system will now be described. Referring now to FIG. 6, one example of a method for selectively displaying graphical indicators corresponding to available system features is shown. Various possible steps of method 600 will now be described. The method 600 illustrated in FIG. 6 may be applicable to the embodiments described above in relation to FIG. 1, but it is understood that the method 600 can be carried out with other suitable systems and arrangements. Moreover, the method 600 may include other steps that are not shown here, and in fact, the method 600 is not limited to including every step shown in FIG. 6. The steps that are illustrated here as part of the method 600 are not limited to this particular chronological order. Indeed, some of the steps may be performed in a different order than what is shown and/or at least some of the steps shown can occur simultaneously.

At block 610, a predefined plurality of feature graphical indicators 165 can be provided. The predefined plurality of feature graphical indicators 165 can be provided on any suitable substrate (e.g. substrate 300 or obscuring panel 160) in any suitable manner. Each of the feature graphical indicators can correspond to a respective feature of a predefined set of features that are potentially included on a device and/or system. The predefined plurality of feature graphical indicators 165 can include any quantity of features. The method can continue to block 620.

At block 620, it can be determined whether one or more features of the predefined set of features are included on the system (e.g. the electronic device 110, or other device or system in which the electronic device 110 is used). In this context, "included" means available and/or enabled. In one or more arrangements, such a determination can be performed by the controller 520, the feature detection module 525 and/or the feature detection system 530. The determination can be performed at any suitable time. For instance, the determination can be performed when the electronic device 110 is powered on and/or when a system associated with the electronic device 110 (e.g. vehicle 510 or a vehicle system) is powered on. The determination can be made continuously, periodically at any suitable interval, or even randomly. The method 600 can continue to block 630.

At block 630, responsive to detecting one or more features of the predefined set of features being included on the system, the feature graphical indicators corresponding to the detected one or more of the predefined set of features that are available on the system can be displayed. The feature graphical indicators can be displayed in any suitable manner. For instance, the feature graphical indicators corresponding to the detected one or more of the predefined set of features that are available on the system or device can be displayed by selectively activating a light source 200 corresponding to a respective feature graphical indicator 165. The selective activation of the light source 200 can be performed by, for example, the controller 520 and/or the feature detection module 525. The method can continue to block 640.

At block 640, responsive to detecting one or more of the predefined set of features are not included on the system, the feature graphical indicators corresponding to the detected one or more of the predefined set of features that are not included on the system or device are not displayed.

Figure 7:
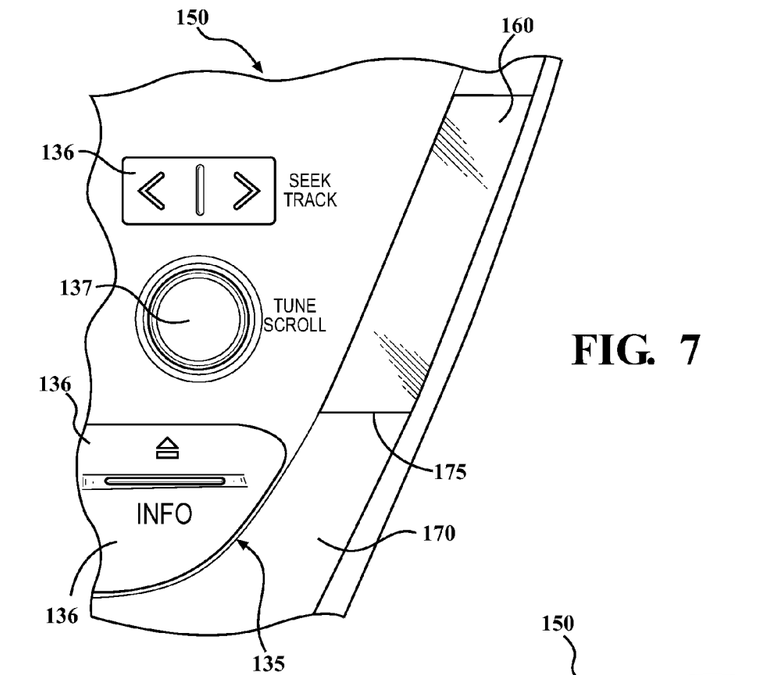
FIG. 7 is an example of a portion of an in-vehicle audio system, wherein a plurality of feature graphical indicators located behind an obscuring panel is substantially not visible.
Figure 8:
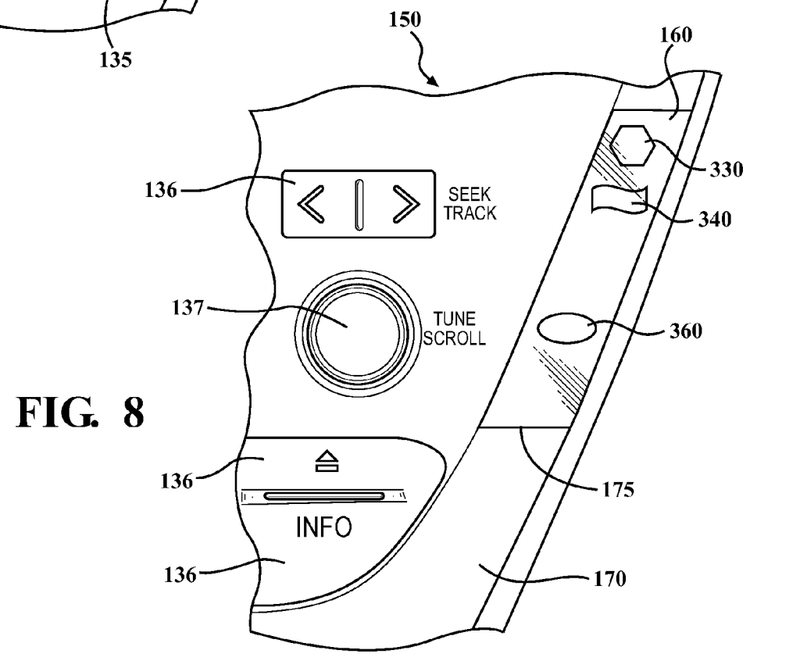
FIG. 8 is an example of a portion of the in-vehicle audio system of FIG. 7, wherein a subset of the plurality of feature graphical indicators located behind the obscuring panel is visible.

A non-limiting example of the systems and methods described herein will now be presented in relation to FIGS. 7 and 8. Referring to FIG. 7, a portion of an in-vehicle audio system is shown. The feature graphical indicators 165 behind the obscuring panel 160 are substantially not visible from the outer side 164 of the obscuring panel 160. This point of time shown in FIG. 7 can be, for example, when the vehicle and/or the electronic device 110 are powered down. For purposes of this example, the predefined set of features can include five features. Accordingly, there can be five corresponding feature graphical indicators 165, such as the feature graphical indicators 330, 340, 350, 360, 370 shown in FIG. 4.

Subsequently, such as when the vehicle and/or the electronic device 110 are powered on or at some other point, it can be determined whether one or more features of the predefined set of features are included on the system. For purposes of this example, it can be determined that three of the predefined set of features can be included on the system and/or device. In particular, it can be determined that features corresponding to the first, second and fourth feature graphical indicators 330, 340, 360 are included on the system and/or device.

Accordingly, the controller 520 can cause the first, second and fourth feature graphical indicators 330, 340, 360 can be selectively displayed in the feature indication area 150. For instance, the controller 520 can selectively activate the light source(s) 200 associated with the first, second and fourth feature graphical indicators 330, 340, 360. As such, the light energy from the light source(s) 200 can illuminate the first, second and fourth feature graphical indicators 330, 340, 360. As a result, the first, second and fourth feature graphical indicators 330, 340, 360 will become visible from the outer side 164 of the obscuring panel 160. A user will be readily apprised of the features that are included on the system and/or device.

It will be appreciated that arrangements described herein can provide numerous benefits, including one or more of the benefits mentioned herein. For example, arrangements described herein can reduce the number of unique parts for an electronic device or system. As a result, there can be a reduction in complexity of assembly and/or inventory. Further, there can be reductions in build variation errors and cost. Arrangements described herein can inform users of the available and/or enabled features of an electronic device. Arrangements described herein can be presented in a visually appealing manner.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of selectively indicating the features included on a system, the method comprising:
analyzing, using one or more sensors, the system for all features in a predefined set of a plurality of features that are potentially included on the system;
determining whether one or more features of the predefined set of a plurality of features are included on the system; and
responsive to determining that one or more features of the predefined set of a plurality of features are included on the system, causing, using a controller, one or more feature graphical indicators corresponding to the one or more features determined to be included on the system to be selectively displayed, the feature graphical indicators being provided on a physical substrate, each of the feature graphical indicators on the physical substrate representing a respective one of the features of the predefined set of a plurality of features that are potentially included on the system.

2. The method of claim 1, wherein causing one or more feature graphical indicators corresponding to the one or more features determined to be included on the system to be selectively displayed includes causing a light source to be selectively activated to illuminate the one or more feature graphical indicators corresponding to the one or more features determined to be included on the system.

3. The method of claim 1, further including:
responsive to determining that one or more features of the predefined set of a plurality of features are not included on the system, feature graphical indicators corresponding to the one or more features that are determined to be not included on the system are not caused to be displayed.

4. The method of claim 1, wherein determining whether one or more features of the predefined set of a plurality of features are included on the system includes determining whether one or more features of the predefined set of a plurality of features are at least one of available and enabled on the system.

5. The method of claim 1, wherein, responsive to determining that a previously included feature of the predefined set of features is no longer included on the system, discontinuing the display of the feature graphical indicator corresponding to the detected previously included feature.

6. The method of claim 1, wherein the system is an audio system, and wherein at least one of the predefined set of features is a satellite radio system.

7. The method of claim 1, further including:
providing an obscuring panel having an inner side and an outer side, wherein the feature graphical indicators are located on the inner side of the obscuring panel.

8. A method of selectively indicating the features included on a system, a plurality of feature graphical indicators being provided on a substrate, each of the feature graphical indicators representing a respective feature of a predefined set of features that are potentially included on the system the method comprising:
determining whether one or more features of the predefined set of features are at least one of available and enabled on the system;
responsive to determining that a feature of the predefined set of features is available and enabled on the system, selectively displaying a feature graphical indicator corresponding to the feature that is determined to be available and enabled on the system by causing a first light source associated with the feature to be activated with a first light energy output characteristic; and
responsive to determining that a feature of the predefined set of features is available and but not enabled on the system, selectively displaying a feature graphical indicator corresponding to the feature that is determined to be available but not enabled on the system by causing a second light source associated with the feature to be activated with a second light energy output characteristic, the second light energy output characteristic being different from the first light energy output characteristic.

9. The method of claim 8, wherein the first light energy output characteristic is wavelength of light energy emitted from the first light source, and wherein the second light energy output characteristic is wavelength of light energy emitted from the second light source, whereby the color of the light energy emitted from the first light source is different from the color of the light energy emitted from the second light source.

10. A system comprising:
an obscuring panel having an inner side and an outer side;
one or more light sources located on the inner side of the obscuring panel;
a plurality of feature graphical indicators provided on a physical substrate, the plurality of feature graphical indicators being located on the inner side of the obscuring panel between the one or more light sources and the obscuring panel, each of the feature graphical indicators corresponding to a respective feature that is potentially included on the system;
a feature detection system including one or more sensors, the feature detection system being configured to analyze an electronic system for all features in a predefined set of a plurality of features that are potentially included on the electronic system; and
a controller operatively connected to the one or more light sources and the feature detection system, the controller being configured to:
responsive to determining that one or more features of the predefined set of a plurality of features are included on the electronic system, causing the feature graphical indicators corresponding to the one or more features determined to be included on the electronic system to be selectively displayed.

11. The system of claim 10, wherein the physical substrate is the inner side of the obscuring panel.

12. The system of claim 10, wherein the physical substrate is a separate element from the obscuring panel.

13. The system of claim 12, wherein the separate element is attached to the obscuring panel.

14. The system of claim 10, wherein the plurality of feature graphical indicators are logos.

15. The system of claim 10, wherein the one or more light sources is a plurality of light sources, wherein at least one light source is provided for each of the feature graphical indicators.

16. The system of claim 15, further including a plurality of light conduits, each of the light conduits being operatively positioned between a respective one or more of the plurality of light sources and a respective one of the feature graphical indicators.

17. The system of claim 10, wherein the controller is operatively connected to adjust a light energy output characteristic of the one or more light sources.

18. The system of claim 10, further including a light conduit operatively positioned between the one or more light sources and the plurality of feature graphical indicators.

19. The system of claim 10, wherein the electronic system is an audio system, and wherein at least one of the predefined set of a plurality of features is a satellite radio system.

20. The system of claim 10, wherein the obscuring panel provides a smoky appearance.

21. A system for a vehicle comprising:
an electronic device included onboard the vehicle;
an obscuring panel having an inner side and an outer side, the obscuring panel being separate from the electronic device;
one or more light sources;
a substrate upon which a plurality of feature graphical indicators are provided, the plurality of feature graphical indicators being located on the inner side of the obscuring panel between the one or more light sources and the obscuring panel, the feature graphical indicators corresponding to a respective feature that is potentially included on at least one of the electronic device; and a controller operatively connected to the electronic device and the one or more light sources, the controller being configured to:

determine whether one or more features of a predefined set of features are included on at least one of the electronic device or the vehicle; and responsive to determining that one or more features of the predefined set of features are included on at least one of the electronic device or the vehicle, causing one or more feature graphical indicators corresponding to the included one or more features of the predefined set of features that are determined to be included on at least one of the electronic device or the vehicle to be displayed by activating one or more of the light sources associated with the one or more feature graphical indicators corresponding to the included one or more features of the predefined set of features that are determined to be included on at least one of the electronic device or the vehicle.

\* \* \* \* \*